United States Patent [19]

Cabestany et al.

[11] Patent Number: 4,906,685
[45] Date of Patent: Mar. 6, 1990

[54] WATER IN OIL DISPERSIONS OF HYDROPHILIC POLYMERS BASED ON ACRYLIC ACID PARTIALLY OR TOTALLY CONVERTED INTO THE SALT FORM WITH AMMONIA

[75] Inventors: Jean Cabestany, Stains; Dominique Marchant, Lamorlaye, both of France

[73] Assignee: Societe Francaise Hoechst, Puteaux, France

[21] Appl. No.: 285,034

[22] Filed: Dec. 16, 1988

[30] Foreign Application Priority Data

Dec. 18, 1987 [FR] France ................................ 87 17743

[51] Int. Cl.$^4$ ............................................ C08L 39/00
[52] U.S. Cl. .................................... 524/555; 524/816; 526/311
[58] Field of Search ...................... 524/555, 815, 816; 526/311

[56] References Cited

U.S. PATENT DOCUMENTS 4,339,371 7/1982 Robinson et al. .................... 524/310
4,581,402 4/1986 Dunk et al. .......................... 524/815

FOREIGN PATENT DOCUMENTS 0068955 1/1983 .
3641700 6/1987 Fed. Rep. of Germany .

Primary Examiner—Joseph L. Schofer
Assistant Examiner—Jeffrey T. Smith
Attorney, Agent, or Firm—Browdy and Neimark

[57] ABSTRACT

Water in oil dispersions of hydrophilic polymers based on acrylic acid partially or totally converted into the salt form with ammonia, which dispersions contain:

(a) 65 to 75% of an aqueous dispersed phase, 35 to 50% of which is a hydrophilic copolymer, having a molecular weight greater than $3 \times 10^6$, based on 0 to 50% acrylamide and 0.008 to 0.1% bisacrylamidoacetic acid partially or totally converted into the salt form with ammonia;
(b) 3 to 7% of an emulsifying system, having overall an HLB value greater than 7,
(c) the remainder (up to 100%) being an oil phase.

4 Claims, No Drawings

WATER IN OIL DISPERSIONS OF HYDROPHILIC POLYMERS BASED ON ACRYLIC ACID PARTIALLY OR TOTALLY CONVERTED INTO THE SALT FORM WITH AMMONIA

FIELD OF THE INVENTION

The present invention relates to water in oil dispersions of hydrophilic polymers based on acrylic acid partially or totally converted into the salt form with ammonia, a method for their preparation and the use of such dispersions especially in colour printing.

DESCRIPTION OF THE PRIOR ART

When colour printing on cloth, it is desirable to use printing pastes which possess physical, chemical and rheological properties giving extremely good performance, and which enable the pastes to be used easily, reliably, economically, reproducibly and without pollution, giving a good colour yield. The printing pastes should also desirably enable easy washing of the printed cloth and should be suitable for printing different types of cloth, optionally containing electrolytes. The printing pastes should also permit the production of printed cloths which possess not only a good resistance to domestic washing, to friction and to light, but which also have a comfortable feel, a pleasant appearance, lively colours, clear and well defined designs, and good colour distribution.

Printing pastes available at present do not allow all the objectives sought by the expert in the field to be obtained simultaneously, both with regard to economics and to the quality of the prints. In particular, commercially available thickeners for colour printing occur either in the form of a solid from which it is difficult to made a suspension, or are in the form of a dispersion which tends to be unstable so that it is usually necessary for measurement of the active material to be performed before the thickener is used.

SUMMARY OF THE INVENTION

The present invention relates to novel water in oil dispersions of hydrophilic polymers, based on acrylic acid which is partially or totally converted into the salt form with ammonia. The water in oil dispersions of the present invention can be used to formulate printing pastes which give complete satisfaction to the user.

The water in oil dispersions of hydrophilic polymers of the present invention are characterized by the fact that they contain by weight:

(a) 65 to 75% of an aqueous dispersed phase, 35 to 50of the weight of the said aqueous dispersed phase being constituted by a hydrophilic polymer, having a molecular weight greater than 3,000,000 formed, in molar proportions, from:

0 to 50% acrylamide, 0.008 to 0.1% bisacrylamidoacetic acid partially or totally converted into the salt form with ammonia, made up to 100% with acrylic acid, of which 65 to 100% is in the form of ammonium acrylate, (b) 3 to 7% of an emulsifying system, herereafter referred to as E, and (c) made up to 100% with an oil phase, hereinafter referred to as H.

DETAILED DESCRIPTION OF THE INVENTION

The emulsifying system E overall has an HLB value greater than 7, and consists of a mixture of at least three surface active agents, of which more than 50% by weight is formed by at least one surface active agent having an HLB between 3 and 5, the complement to 100% is formed by at least two surface active agents individually having an HLB between 11 and 14.

A definition of HLB is given by W. G. GRIFFIN in "Classification of Surface Active Agents by HLB" J. Soc. Cosmetic Chemists, 1950, page 311 onwards.

Surface active agents having an HLB between 3 and 5 include, in particlar, esters of sorbitan such as sorbitan monooleate and sorbitan sesquioleate. Surface active agents having an HLB between 11 and 14 include, in particular, alkylphenols ethoxylated with 6 to 30 moles of ethylene oxide, such as nonylphenol ethoxylated with 8 moles of ethylene oxide.

The continuous oil phase H is constituted by one or a plurality of hydrocarbons which are liquid at ambient temperature, containing less than 20% by weight of aromatic hydrocarbons and having a density, determined at 20° C., greater than 0.8 g/cm$^3$, a kinematic viscosity, determined at 20° C., greater than 10 mm$^2$/s and a boiling point above 250°C.

Such hydrocarbons are currently used as lubricants for high precision machines. Because of the characteristics of the oil phase H, the volume fraction of the dispersions according to the invention is close to 0.7. It should be noted that the term "volume fraction of a dispersion" refers to the ratio of the volume of the aqueous phase to the total volume of the dispersion.

Dispersions according to the invention may also contain various additives customary for this kind of product such as chelating agents, biocides and antioxidants.

Dispersions according to the invention exhibit simultaneously, on the one hand, a Brookfield viscosity between 1.5 and 3.5 Pa.s (measured at 20° C. at a speed of 20 rpm), which is considerably increased by dilution to reach 25 to 40 Pa.s with 1% of copolymer dry weight in 17 mM aqueous sodium chloride solution and, on the other hand, a conventional (pseudoplastic) rheological flow behaviour having an Ostwald rheological equation: shear stress as a function of increase in speed, of the type $ax^m$ with m less than 1. In addition, these dispersions have an excellent stability both to sedimentation and to shearing.

In order to be able to determine the order of size of the mean molecular weights of the copolymers present in the dispersions in accordance with the invention, by application of the equation of I. Noda and T. Tsuge, J. Phys. Chem., 1970, 74, 710, the intrinsic viscosity was determined by a copolymer obtained by performing polymerization with the same monomers, and under the same conditions, but in the absence of cross-linking monomers. In this way an intrinsic velocity, determined at 25° C. to 100 mM sodium bromide solution, between 30 and 40 dl/g was obtained which corresponds to a linear copolymer having a molecular weight between 4,000,000 and 6,000,000. The same copolymers when cross-linked will undoubtedly have a greater molecular weight.

The stability of dispersions in accordance with the invention has been determined by subjecting the dispersions firstly to centrifugal sedimentation for 30 minutes at 20° C. using an acceleration of 2,000 G and secondly to a shearing stress performed by stirring the dispersions for 10 minutes at 10,000 rpm. In the first test a separation of the oil phase equal to 1% by volume and a sedimentation less than 5% by volume was observed. In the second test, a test of mechanical stability, the dispersions remained unchanged and retained all their properties.

The aqueous dispersed phase of dispersions in accordance with the invention is usually an aggregate of particles of copolymer swollen by water, the size of which, determined by the method of quasi-elastic light scattering after dilution of the dispersion in 1000 times its volume of dispersion serum, is between 200 and 300 nanometers.

Preferred compositions according to the present invention consist in molar proportions, of:
30 to 40% acrylamide,
0.008 to 0.05% ammonium bisacrylamidoacetate,
the complement to 100% ammonium acrylate.
Other preferred dispersions consist of:
25 to 50% acrylamide,
0.008 to 0.05% bisacrylamidoacetic acid of which more than 50% is in the form of ammonium bisacrylamidoacetate,
the complement to 100% is acrylic acid, of which 65 to 75% in the form of ammonium acrylate.
or of:
5% acrylamide,
0.008 to 0.05% bisacrylamidoacetic acid of which more than 50% is in the form of ammonium bisacrylamidoacetate,
the complement to 100% to acrylic acid, of which 65 to 75% is in the form of ammonium acrylate.

According to the invention, the dispersions defined above may be prepared by a process which is characterized in that:
(a) an aqueous solution of monomers is prepared having a concentration between 35 and 50% by weight and a pH between 5.2 and 7,
(b) the aqueous solution of the above monomers is then emulsified in the oil phase by means of a turbine, in an inert atmosphere, in the presence of a surface active agent or agents having an HLB less than 5, until a water in oil emulsion is obtained having a viscosity value between 3 and 4 Pa.s,
(c) polymerization is initiated by introducing into the fully deoxygenated emulsion obtained, with stirring, in an inert atmosphere and at a temperature between 5° and 15° C., less than 0.05% by weight, relative to the weight of monomers used, of a liposoluble redox initiating system generating free radicals, then the polymerization reaction is left to develop without external cooling in a quasi-adiabatic manner, and finally the polymerization is terminated by heating at a temperature close to 80° C.,
(d) if necessary, the reaction medium is concentrated by vacuum distillation at a temperature less than 65° C., in order to obtain the desired dry weight content, and finally the remainder of the surface active agent, optionally with additives usual for this kind of dispersion, is incorporated with stirring.

Advantageously the liposoluble redox initiating system employed may be that described in European patent No. 0 100 693.

In an alternative embodiment of the process according to the invention, certain additives, especially chelating agents, may be added directly to the aqueous solution of monomers.

Dispersions according to the present invention possess desirable thickening properties associated with excellent stability and good rheological behaviour, which makes them perform extremely well in the preparation of pastes for colour printing. The pastes thus obtained are little affected by electrolytes, they are stable on storage, and they enable reproducible prints to be obtained without it being necessary to check and adjust their composition.

The following examples demonstrate the invention without limiting it in any way.

EXAMPLE 1

An aqueous solution constituted by:
68.4 g (950 mmoles) acrylic acid,
3.55 g (50 mmoles) acrylamide,
33.1 mg (0.167 mmoles) bisacrylamidoacetic acid,
10.84 g (636.5 mmoles) ammonia,
113 g water was emulsified in an organic solution by a turbine, in an inert atmosphere, at a temperature between 5° and 10° C., until a water in oil dispersion having a stable Brookfield viscosity of 3800 mPa.s was obtained.

The organic solution, hereinbelow referred to as S, consisted of:
63 g (78 ml) mineral oil, having a boiling point between 310° and 340° C., a kinematic viscosity at 20° C. of 10.6 mm$^2$/s (determined by the standard procedure ASTM D 445), a density at 15° C. of 0.806 g/cm$^3$, and containing 80% paraffins and 20% naphthenic hydrocarbons,
6 g sorbitan sesquioleate (HLB=3.7).

This emulsion was then deoxygenated by purging with nitrogen, and the following were introduced successively, with stirring, at a temperature between 5° and 10° C.:
5.8 mg (0.038 mmole) cumene hydroperoxide,
8.3 mg (0.070 mmole) sulphinyl chloride (thionyl chloride)

The polymerization reaction started quickly with an average increase in temperature of 2° to 3° C., per minute with peaks of 20° C. per minute. The reaction medium reached a temperature of 80° C. in a few minutes, with temperature was maintained for 1 hour by slight external heating.

The reaction medium was then cooled and the following were then incorporated with stirring:
2.7 g nonylphenol ethoxylated with 8 moles of ethylene oxide (HLB=12.3),
2.7 g nonylphenol ethoxylated with 10 moles of ethylene oxide (HLB=13.3).

In this way 270 g of a water in oil dispersion were obtained having the following characteristics:
volume fraction: 0.68;
Brookfield viscosity (determined at 25° C. at a speed of 20 rpm): 2 Pa.s;
stability to sedimentation: less than 1% by volume of oil phase separated after 30 minutes centrifugration at 2000 G;
mechanical stability: dispersion unchanged after 10 minutes stirring at 10,000 rpm with a turbine;
content of active substances: 30.5%;
size of particles: 200 to 300 nanometers (measured with a MALVERN Autosizer II light scattering apparatus) after dilution 1000 times with solution S;

rheology of an aqueous suspension of the polymer:
Tau=7.70D$^{0.28}$ (where tau is the stress exposed in Pascals and D is the speed gradient in seconds$^{-1}$) measured with a CONTRAVES rheomat;

Brookfield viscosity of an aqueous dispersion containing 1% dry weight of polymer: 35 Pa.s (measured at 25° C. at a speed of 20 rpm);

Brookfied viscosity of an aqueous dispersion containing 1% dry weight of polymer in a 17 mM solution of sodium chloride: 16 Pa.s.

EXAMPLE 2

Example 1 was repeated employing only 24.8 mg (0.125 mmole) bisacrylamidoacetic acid. In this way 217 g of a water in oil dispersion was obtained having the same characteristics as the dispersion obtained in example 1 except that the Brookfield viscosities of the 1% solutions in water and in 17 mM sodium chloride were 31 and 14.2 Pa.s respectively.

EXAMPLES 3 TO 9

Example 1 was repeated employing the quantities given in Table 1 in which the following abbreviations are used:

ABAA: bisacrylamidoacetic acid.
TA$_1$: sorbitan sesquioleate.
TA$_2$: nonylphenol ethoxylated with 8 moles of ethylene oxide.
TA$_3$: nonylphenol ethoxylated with 10 moles of ethylene oxide.
Oil H$_1$: oil employed in example 1.
MA: concentration of active meterial.
O: volume fraction.
Vi of the latex: Brookfield viscosity of the latex measured at 20° C. at a speed of 20 rpm and expressed in mPa.s.
Vi of 1% in water: Brookfield viscosity of a 1% dry weight solution of polymer in water, measured at 20° C. at a speed of 20 rpm and expressed in Pa.s.
Vi of 1% in 0.1% NaCl: Brookfield viscosity of a 1% dry weight solution of polymer in an aqueous 17 mM solution of sodium chloride, measured at 20° C. at a speed of 20 rpm and expressed in Pa.s.
Stability: stability to sedimentation after 30 minutes centrifugation at 2000 G. This stability is said to be excellent if less than 1% by volume oil phase separated.

TABLE 1

| Example No. | 3 g | 3 mmoles | 4 g | 4 mmoles | 5 g | 5 mmoles | 6 g | 6 mmoles | 7 g | 7 mmoles | 8 g | 8 mmoles | 9 g | 9 mmoles |
|---|---|---|---|---|---|---|---|---|---|---|---|---|---|---|
| Acrylic acid | 64.85 | 900 | 57.65 | 800 | 50.45 | 700 | 43.25 | 600 | 36 | 500 | 43.25 | 600 | 50.45 | 700 |
| Acrylamide | 7.11 | 100 | 14.22 | 200 | 21.30 | 300 | 28.43 | 400 | 35.55 | 500 | 28.45 | 400 | 21.30 | 300 |
| Ammonia | 10.27 | 603 | 9.13 | 536 | 7.99 | 469 | 6.85 | 402 | 5.70 | 335 | 10.22 | 600 | 11.92 | 700 |
| ABAA | 0.025 | 0.12 | 0.025 | 0.12 | 0.025 | 0.12 | 0.025 | 0.12 | 0.025 | 0.12 | 0.025 | 0.12 | 0.025 | 0.12 |
| Weight of monomer | 82.25 | | 81.02 | | 79.76 | | 78.53 | | 77.27 | | 81.95 | | 83.69 | |
| TA$_1$ | 6 | | 6 | | 6 | | 6 | | 6 | | 6 | | 6 | |
| Water | 113.93 | | 115.16 | | 116.42 | | 117.63 | | 118.91 | | 116.23 | | 112.49 | |
| Weight of aqueous phase | 202.2 | | 202.2 | | 202.2 | | 202.2 | | 202.2 | | 202.2 | | 202.2 | |
| Oil H$_1$ | 63 | | 63 | | 63 | | 63 | | 63 | | 63 | | 63 | |
| TA$_2$ | 2.7 | | 2.7 | | 2.7 | | 2.7 | | 2.7 | | 2.7 | | 2.7 | |
| TA$_3$ | 2.7 | | 2.7 | | 2.7 | | 2.7 | | 2.7 | | 2.7 | | 2.7 | |
| Total weight | 270.6 | | 270.6 | | 270.6 | | 270.6 | | 270.6 | | 270.6 | | 270.6 | |
| MA | 30.35 | | 29.9 | | 29.43 | | 28.98 | | 28.51 | | 30.24 | | 30.88 | |
| O | 0.68 | | 0.68 | | 0.68 | | 0.68 | | 0.68 | | 0.68 | | 0.68 | |
| V$_i$ of latex | 2700 | | 2850 | | 2500 | | 2850 | | 3350 | | 1900 | | 2000 | |
| V$_i$ of 1% in water | 22 | | 27.5 | | 33.2 | | 36 | | 36 | | 31 | | 27.5 | |
| V$_i$ of 0.1% NaCl | 12.8 | | 14 | | 17 | | 14 | | 12 | | 14 | | 18.5 | |
| Stability | excellent | | excellent | | excellent | | excellent | | excellent | | excellent | | excellent | |
| pH of the aqueous phase before polymerization | 5.2 | | 5.2 | | 5.2 | | 5.2 | | 5.2 | | 6.8 | | 6.8 | |

EXAMPLE 10

Example for comparison

Example 1 was repeated employing as oil 78 ml (58.5 g) of linear $C_{10}$-$C_{13}$ paraffins, having a boiling point between 184° and 211° C., a density at 15° C. of 0.75 g/cm$^3$, and a kinematic viscosity of 1.93 mm$^2$/s measured at 20° C.

In this way a water in oil dispersion having the following characteristics was obtained:

volume fraction: 0.68,
Brookfield viscosity measured at 20° C. at a speed of 20 rpm: 1300 mPa.s;
stability to sedimentation: very bad. After 30 minutes centrifugation at 2000 G, 10% of oil phase separated with the formation of a sediment of about 50% at the bottom of the container.

EXAMPLE 11

Example of use

A diluted mixture of a paste for colour printing was prepared by mixing, at ambient temperature:

30 g of binder based on acrylic copolymers (binder IMPERON N 66, marketed by the applicant),
X g of a dispersion obtained according to one of the examples 1–9 so as to obtain a diluted mixture having a Haake viscosity of 7200 mPa.s,
sufficient 50% ammonia to bring to pH 7,
the quantity of water required to obtain 500 g of diluted mixture.

200 g of the above mixture were then mixed with 3 g of pigment (Bleu IMPERON KB, marketed by the applicant), then the pigmented paste thus obtained was employed to imprint a 100% poplin using a laboratory printing machine equipped with a 77 mesh frame (cf French standard NFX 11-508).

The printed cloth was then dried at 120° C. for 50 seconds, then treated for 80 seconds at a temperature of 170° C. and finally, after cooling, it was subjected to the following tests:

Ta: test of resistance to friction according to French standard NF G07-016,

Tb: test of resistance to domestic washing. In this test a sample of cloth is subjected to 1, 3, 5 and 10 successive domestic washes before being compared with a control sample,
Tc: qualitative test of colour yield,
Td: qualitative test of feel,
Te: qualitative test of colour distribution,
Tf: qualitative test of penetration of the sample.
The results obtained are given in Table II.

TABLE II

|  | X | Ta | Tb | Tc | Td | Te | Tf |
|---|---|---|---|---|---|---|---|
| Dispersion as in Example 1 | 13.2 | E | E | E | E | E | E |
| Dispersion as in Example 2 | 13.5 | E | E | E | E | E | E |
| Dispersion in Example 6 | 12.4 | E | E | E | E | E | E |
| Dispersion in Example 7 | 13.1 | E | E | VG | E | E | VG |
| Dispersion as in Example 8 | 13.1 | E | E | VG | E | VG | VG |

E = excellent
VG = very good

It is obvious that the present invention has been described only by way of explanatory and non-limiting example, and that any useful modification may be made without departing from the body of the invention.

We claim:

1. Stable water in oil dispersions of hydrophilic polymers based on acrylic acid partially or totally converted into the salt form with ammonia, intended for the preparation of pastes for colour printing, characterized by the fact that they contain by weight:
   (a) 65 to 75% of an aqueous dispersed phase, 35 to 50% of the weight of the said aqueous dispersed phase being constituted by a hydrophilic polymer, having a molecular weight greater than 3,000,000 formed, in molar proportions, from:
   0 to 50% acrylamide,
   0.008 to 0.1% bisacrylamidoacetic acid partially or totally converted into the salt form with ammonia,
   made up to 100% with acrylic acid, of which 65 to 100% is in the form of ammonium acrylate,
   (b) 3 to 7% of an emulsifying system, having overall an HLB value greater than 7, constituted by a mixture of at least three surface active agents, of which more than 50% by weight is contributed by at least one surface active agent having an HLB between 3 and 5, and the complement to 100% being contributed by at least two surface active agents individually having an HLB between 11 and 14,
   (c) the complement to 100% is an oil phase constituted by one or a plurality of hydrocarbons which are liquid at ambient temperature, containing less than 20% by weight of aromatic hydrocarbons and having simultaneously a density, determined at 20° C., greater than 0.8 g/cm$^3$, a kinematic viscosity, determined at 20° C., greater than 10 mm$^2$/s and a boiling point above 250° C.

2. Dispersions according to claim 1, characterized in that the hydrophilic copolymer is based, in molar proportions, on:
   30 to 40% acrylamide,
   0.008 to 0.05% ammonium bisacrylamidoacetate,
   the complement to 100% ammonium acrylate.

3. Dispersions according to claim 1 characterized in that the hydrophilic coplymer is based, in molar proportions, on:
   25 to 50% acrylamide,
   0.008 to 0.05% bisacrylamidoacetic acid of which more than 50% is in the form of ammonium bisacrylamidoacetate,
   the complement to 100% is acrylic acid, of which 65 to 75% is in the form of ammonium acrylate.

4. Dispersions according to claim 1, characterized in that the hydrophilic copolymer is based, in molar proportions, on:
   5% acrylamide,
   0.008 to 0.05% bisacrylamidoacetic acid of which more than 50% is in the form of ammonium bisacrylamidoacetate,
   the complement to 100% is acrylic acid, of which 65 to 75% is in the form of ammonium acrylate.

* * * * *